UNITED STATES PATENT OFFICE.

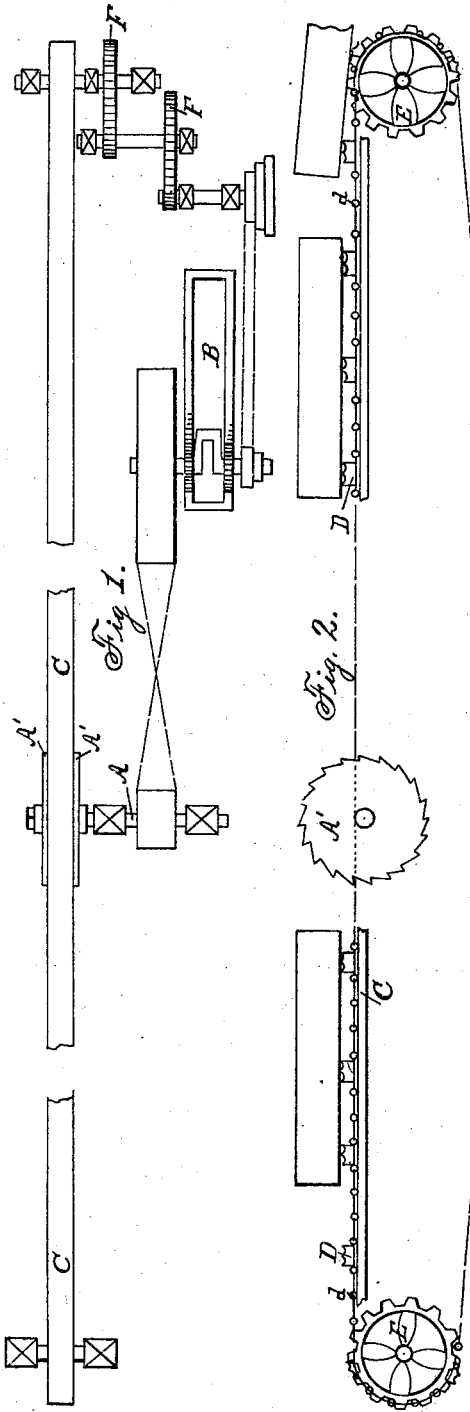

JOHN CAMPBELL, OF WINDSOR, ONTARIO, CANADA.

CIRCULAR-SAW MILL.

SPECIFICATION forming part of Letters Patent No. 254,110, dated February 28, 1882.

Application filed December 9, 1881. (No model.)

*To all whom it may concern:*

Be it known that I, JOHN CAMPBELL, of Windsor, Province of Ontario, Canada, have invented a new and useful Improvement in Railway-Tie-Sawing Machine; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter described, and more particularly pointed out in the claims.

In the drawings, Figure 1 represents a plan view of an apparatus embodying my invention. Fig. 2 is a side elevation of the same. Fig. 3 is a side elevation of one of the log-supports, and also constituting one of the links of the continuous chain which bears the logs to the saws. Fig. 4 is an end elevation of the same. Fig. 5 is a separate side view of one of the intermediate links.

The object of my invention is to produce a mechanism for very rapidly sawing two opposite faces from a tie-log, so as to make a finished railway-tie at a single operation, and to make them successively without the necessity of gigging back for the next log.

To this end, A represents a saw-shaft, provided with a gang of two saws, A'.

B is an engine or other suitable power for driving the saws.

C is a continuous way, upon which travels a continuous chain or log carriage composed of links, *d*, interspersed at regular intervals with log-bearing links D. This chain is driven by any suitable means—as, for instance, the sprocket-wheel E, which is geared with the driving-power in any suitable way, though in practice I prefer to gear it with intermediate speeding mechanism, F, whereby any degree of speed may be given to the bearing-chain D *d*. This bearing-chain D *d* is caused to pass between the two or more saws and over the saw-shaft, and the bearing-links D are preferably provided with a jagged or serrated edge, so as to serve to dog the log firmly and not permit it to be disturbed by the saws. The saws are located as far apart as equals the thickness of the tie between its top and bottom faces, and are arranged to be adjusted to any suitable thickness of tie.

In use the device is operated as follows: The mechanism may be located at any suitable point. For instance, its end shown at the left in the drawings may project out contiguous to a suitable logway and the tie-logs be rolled upon the bearing-links as rapidly as the forward one has advanced far enough to permit it, and these logs, as rapidly as they are fed to the chain, are carried by the chain forward between the saws and both faces simultaneously removed by the saws. As they pass beyond the saws they may be rolled from the chain and borne away; or, if desired, the right-hand end of the apparatus may terminate upon any suitable flat or other boat or car, so that the mechanism will not only handle and saw the ties continuously, but bear them off to the vehicle for conveying them to the market.

The receiving end of the device might be so located beneath the water that logs could be floated right from a boom onto the bearing-links, so as to avoid the necessity of handling the logs.

To make the device portable, I propose to locate it, if desired, upon a flat-boat, so that it can be floated from place to place and do its work without removing it to the land at all.

If in practice it would seem to be necessary, I would locate just in front of and beyond the saws, at the points E, pressure-rollers adapted to yield to inequalities of the logs, yet to exert a sufficient pressure upon them to hold them rigidly in their places in case there was a tendency to shift when under the influence of the saws.

I do not limit myself to any particular construction of the bearing-band, only that it shall be a continuous band.

It is apparent that instead of employing two saws upon the same shaft, with the carriage or band passing between them and over the shaft, there might be two shafts coming from opposite directions and terminating one at each side of the carriage, and each shaft having a saw at its end. So, also, these saws might be located with the two shafts in the same line, or one saw might be given a greater or less lead in advance of the other.

It is also apparent that there may be two or more of these devices, arranged side by side, with independent saws, so as all to be driven by the same power, and thus the capacity be doubled or trebled, &c.; and I would have it understood that these variations are all contemplated in my invention.

What I claim is—

1. The combination, with a gang of two circular saws arranged at a suitable distance apart, of a chain-supporting way, arranged between said saws and extending on opposite sides thereof, and an endless-band chain, arranged to travel upon said way between said saws, and provided with a series of spaced links having outwardly-projecting log-holders arranged to pass between said saws and carry logs longitudinally between the same, substantially as described.

2. The combination, with the two circular saws and a chainway between and extending on both sides thereof, of the band-chain, provided with the spaced log-carriers and means for driving said saws and chain, the said chain and its supporting-way being of sufficient length and properly arranged to support simultaneously a log that is being sawed, another that has been sawed and is being carried away from the saws, and another that is approaching the saws, so that receiving, sawing, and delivering the logs are performed as a continuous operation, substantially as described.

In testimony whereof I sign this specification in the presence of two witnesses.

JOHN CAMPBELL.

Witnesses:
J. EDWARD WARREN,
SAMUEL E. THOMAS.